United States Patent
Yao et al.

(10) Patent No.: US 10,984,530 B1
(45) Date of Patent: Apr. 20, 2021

(54) ENHANCED MEDICAL IMAGES PROCESSING METHOD AND COMPUTING DEVICE

(71) Applicant: Ping An Technology (Shenzhen) Co., Ltd., Shenzhen (CN)

(72) Inventors: Jiawen Yao, College Park, MD (US); Dakai Jin, Laurel, MD (US); Le Lu, Poolesville, MD (US)

(73) Assignee: Ping An Technology (Shenzhen) Co., Ltd., Shenzhen (CN)

( * ) Notice: Subject to any disclaimer, the term of this patent is extended or adjusted under 35 U.S.C. 154(b) by 22 days.

(21) Appl. No.: 16/710,086

(22) Filed: Dec. 11, 2019

(51) Int. Cl.
*G06K 9/00* (2006.01)
*G06T 7/00* (2017.01)
*G06T 7/136* (2017.01)
*G06T 7/38* (2017.01)

(52) U.S. Cl.
CPC ............ *G06T 7/0014* (2013.01); *G06T 7/136* (2017.01); *G06T 7/38* (2017.01); *G06T 2207/10028* (2013.01); *G06T 2207/20081* (2013.01); *G06T 2207/20084* (2013.01); *G06T 2207/20104* (2013.01); *G06T 2207/20128* (2013.01)

(58) Field of Classification Search
None
See application file for complete search history.

(56) References Cited

U.S. PATENT DOCUMENTS

| 2011/0002520 | A1* | 1/2011 | Suehling | G06T 7/0012 382/131 |
| 2015/0286786 | A1* | 10/2015 | El-Baz | G16H 30/40 382/131 |
| 2017/0003366 | A1* | 1/2017 | Jafari-Lhouzani | G06T 7/0012 |
| 2018/0005417 | A1* | 1/2018 | Schieke | G06T 7/0016 |
| 2019/0108634 | A1* | 4/2019 | Zaharchuk | G06T 7/50 |
| 2019/0237186 | A1* | 8/2019 | El-Baz | G16H 30/40 |
| 2020/0074633 | A1* | 3/2020 | Fuchigami | A61B 5/0042 |

\* cited by examiner

*Primary Examiner* — Atiba O Fitzpatrick
(74) *Attorney, Agent, or Firm* — ScienBiziP, P.C.

(57) ABSTRACT

An enhanced medical images processing method and a computing device includes: acquiring series of enhanced medical images and detecting a phase of each enhanced medical image in the series of enhanced medical images using a pre-trained 3D convolutional neural network model. A plurality of target enhanced medical images from the enhanced medical image are selected according to the phases. A plurality of interest images is obtained by identifying and segmenting an interest region in each of the plurality of target enhanced medical images, and finally registering the plurality of interest images. The registered images have clear phase markers and are all spatially aligned, allowing a subsequent doctor or clinician to directly use the registered interest images for diagnosis without the need to rescan the patient.

20 Claims, 4 Drawing Sheets

ENHANCED MEDICAL IMAGES PROCESSING METHOD AND COMPUTING DEVICE

FIELD

The present disclosure relates to a technical field of 3D medical images, specifically an enhanced medical images processing method and a computing device.

BACKGROUND

With application of contrast media for clinical purposes, effectiveness of images is enhanced, and accuracy of diagnoses is improved. Medical images obtained by scanning a patient using an image scanning device after intravenous injection of contrast media are called enhanced medical images.

However, some radiologists may identify phase types on the enhanced medical images, and other radiologists do not make the same identification. Even if some of the enhanced medical images are accompanied by text, the accompanying text may be vague, so distinguishing the phase type by the text is difficult. Furthermore, since different enhanced medical images are scanned at different time points, it is difficult to ensure that the enhanced medical images of different phases are spatially aligned even using the same image scanning device. As a result, some clinicians find it difficult to diagnose diseases based on enhanced medical images alone.

A solution for processing the enhanced medical images is required.

DETAILED DESCRIPTION

The embodiments of the present disclosure are described with reference to the accompanying drawings. Described embodiments are merely embodiments which are a part of the present disclosure, and do not include every embodiment. All other embodiments obtained by those of ordinary skill in the art based on the embodiments of the present disclosure without creative efforts are within the scope of the claims.

Terms such as "first", "second" and the like in the specification and in the claims of the present disclosure and the above drawings are used to distinguish different objects, and are not intended to describe a specific order. Moreover, terms "include" and any variations of the term "include" are intended to indicate a non-exclusive inclusion. For example, a process, a method, a system, a product, or a device which includes a series of steps or units is not limited to steps or units which are listed, but can include steps or units which are not listed, or can include other steps or units inherent to such processes, methods, products, and equipment.

Figure 1:
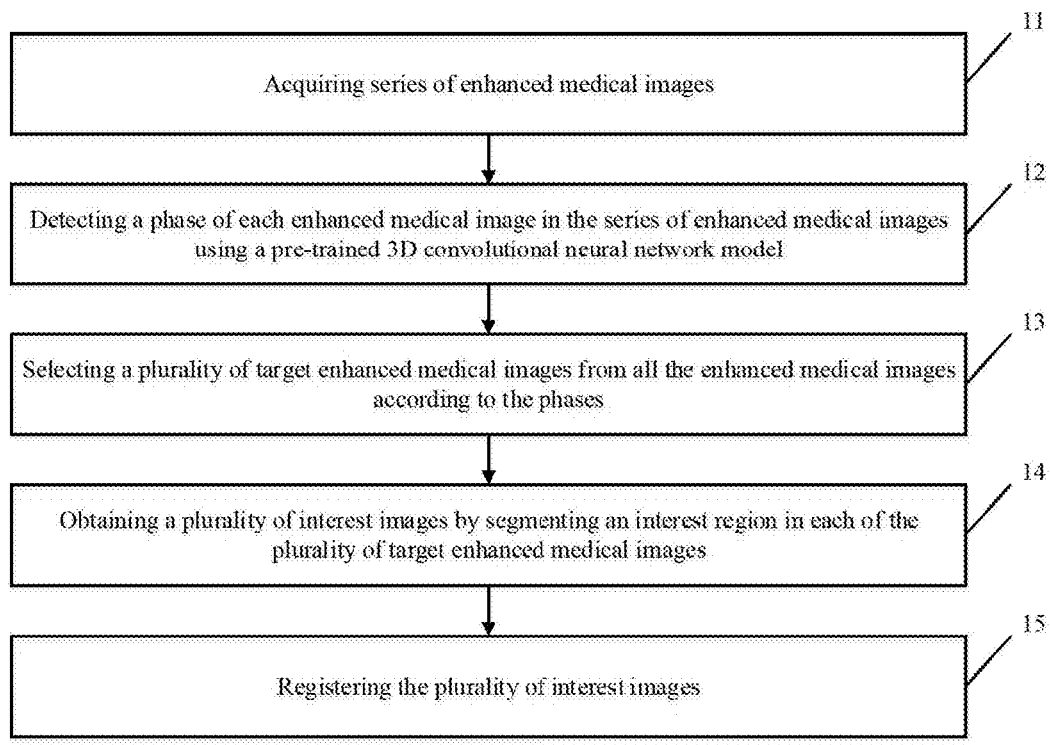
FIG. 1 shows a schematic flow chart of an embodiment of an enhanced medical images processing method according to the present disclosure.

FIG. 1 shows a schematic flow chart of an embodiment of an enhanced medical images processing method according to the present disclosure.

As shown in FIG. 1, the enhanced medical images processing method applicable in a computing device can include the following steps. According to different requirements, the order of the steps in the flow chart may be changed, and some may be omitted.

In block 11, acquiring series of enhanced medical images.

In one embodiment, the series of enhanced medical images are obtained by scanning a patient's body part with an image scanning device after intravenous injection of contrast media. Enhanced medical image corresponding to different phases between multiple planes can be considered as one frame in the series of enhanced medical images. That is, the series of enhanced medical images will include a plurality of enhanced medical images.

The patient may be a patient suffering from any tumor, such as a liver tumor, a lung tumor, a lymphoma tumor, a hepatic hemangioma, or the like. Thus, the method described in embodiments of the present disclosure assists a doctor to diagnose a patient with any tumor.

The image scanning device can be, for example, a Computed Tomography (CT), a Magnetic Resonance Imaging (MRI), a positron emission tomography (PET), a single photon emission computed tomography (SPECT), a ultrasound scanning, a rotational angiography, and other medical imaging modalities. Correspondingly, the enhanced medical image can be an enhanced CT image, an enhanced MRI image, an enhanced PET image, an enhanced SPECT image, an enhanced ultrasound scan image, and an enhanced rotational angiography image and other enhanced medical imaging modal images.

Block 12, detecting a phase of each enhanced medical image in the series of enhanced medical images using a pre-trained 3D convolutional neural network model.

In one embodiment, the phase of each enhanced medical image in the series of enhanced medical images is re-marked by the pre-trained 3D convolutional neural network model to obtain an accurate phase, thereby enabling effective management of the enhanced medical images.

In order to facilitate understanding of the method according to the embodiment of the present disclosure, the following describes an example of taking an enhanced CT image series of a liver tumor patient. The series of enhanced medical, images includes a plurality of enhanced medical images.

Phases shown in the enhanced CT images of the liver tumor patient include a non-contrast phase, an arterial phase, a venous phase, and a delayed phase. The non-contrast phase is before any contrast media is injected into a body of the patient. The non-contrast phase can reveal calcifications, fat in tumors, and fat-stranding as seen in inflammations like appendicitis, diverticulitis, omental infarction, etc. The arterial phase is when a contrast media is moved from the heart into the arteries, all structures/organs that get their blood supply from the arteries will show optimal enhancement. In the aorta, a major enhancement can be observed. The venous phase is when the contrast media is in the veins, flowing back to the heart. In the venous phase, the liver parenchyma is enhanced through blood supply by the portal vein and some enhancement of the hepatic veins can be seen. The delay phase is when the contrast media flows out of the kidney. Sometimes delay phase is called "washout phase" or "equilibrium phase". There is wash out of contrast media in all structures of the body except for fibrotic tissue, because fibrotic tissue has a poor late washout and will become relatively dense compared to normal tissue.

It should be noted that, in this embodiment, the phases of the enhanced CT images marked by using the pre-trained 3D convolutional neural network model include the non-contrast phase, the arterial phase, the vein phase, the delay phase, and other phases. The term "other phases" means the phases of tumors in all other parts of the body except for these four phases. That is, the pre-trained 3D convolutional neural network model marks phases that are not the non-contrast phase, the arterial phase, the vein phase, and the delay phase as such other phases. As such, phase markers of the enhanced CT images of the liver tumor patient become a five-category problem.

Figure 3:
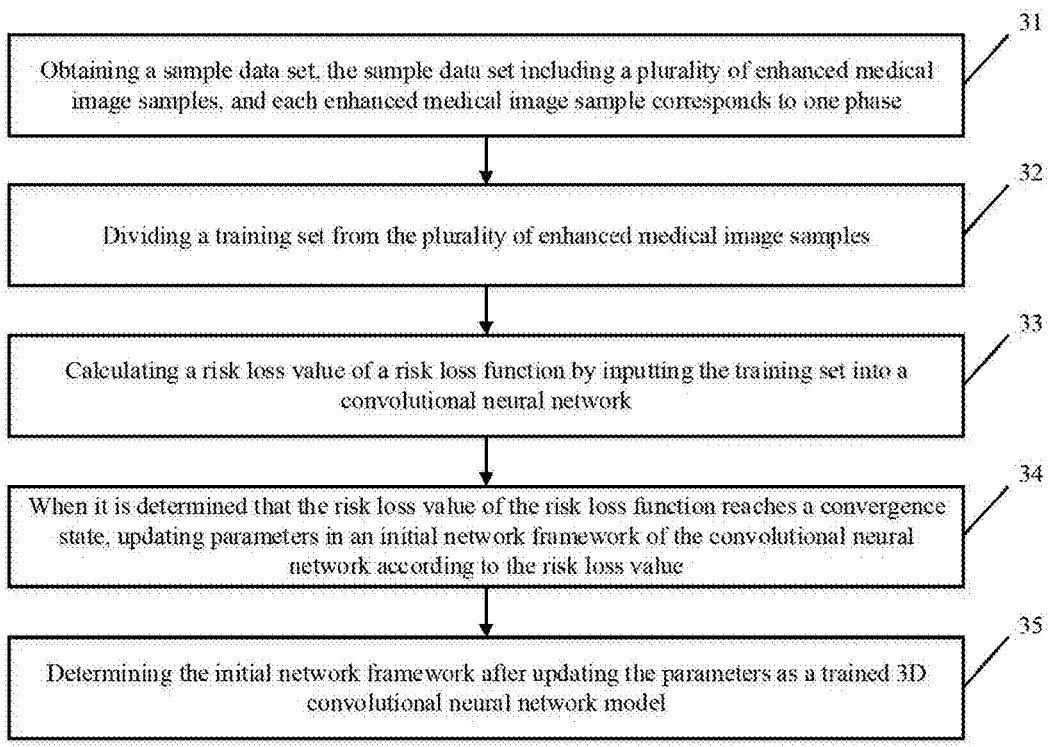
FIG. 3 shows a schematic flow chart of an embodiment of a 3D convolutional neural network model training method according to the present disclosure.

FIG. 3 shows a training process of the 3D convolutional neural network model.

Block 13, selecting a plurality of target enhanced medical images from all the enhanced medical images according to the phases.

In one embodiment, the series of enhanced medical images can include a plurality of enhanced medical images. Each of the enhanced medical images corresponds to one phase, and different enhanced medical images may correspond to different phases, or may correspond to the same phase.

In some embodiments, the selection of the target enhanced medical images from all the enhanced medical images according to the phases includes screening a plurality of target phases from all the phases and selecting a plurality of target enhanced medical images corresponding to the plurality of target phases from the enhanced medical images.

For example, the non-contrast phase, the arterial phase, the venous phase, and the delayed phase being screened from the phases as the plurality of target phases, and enhanced medical images corresponding to the non-contrast phase being selected from the enhanced medical images, enhanced medical images corresponding to the arterial phase being selected from the enhanced medical images, enhanced medical images corresponding to the venous phase being selected from the enhanced medical images, enhanced medical images corresponding to the delayed phase being selected from the enhanced medical images. The enhanced medical images corresponding to the non-contrast phase, the enhanced medical images corresponding to the arterial phase, the enhanced medical images corresponding to the venous phase, and the enhanced medical images corresponding to the delayed phase being as the plurality of target enhanced medical images.

Doctors can diagnose different diseases, and the phases of medical interest and the enhanced medical images viewed of this disclosure may be different. For example, when diagnosing liver tumor diseases, doctors focus on the enhanced CT images corresponding to the non-contrast phase, the arterial phase, the venous phase, and the delayed phase, without paying attention to the enhanced CT images corresponding to the other phases. Thus, the computing device sets a plurality of target phase types in advance according to type of disease being diagnosed. For example, in diagnosis of liver tumor, a plurality of target phase types set in advance are: the non-contrast phase, the arterial phase, the vein phase, and the delay phase.

After detecting the enhanced medical images using the 3D convolutional neural network model, a plurality of target phases are screened from all phases, and enhanced medical images corresponding to the plurality of target phases are selected as the target enhanced medical images for subsequent processing.

Block 14, obtaining a plurality of interest images by segmenting an interest region in each of the plurality of target enhanced medical images.

In one embodiment, the interest region refers to a region in the target enhanced medical image where lesions occur. An improved 3D U-Net (deeply-supervised net) can be used to detect the interest region in each of the plurality of target enhanced medical images, such as the liver region, and then segment or isolate the interest region from each of the target enhanced medical images to obtain the plurality of interest images.

The improved 3D U-Net enables the semantics of the intermediate feature map to be discernible at each image scale, resulting in better results than with an original U-Net.

The improved 3D U-Net is known in prior art, and a process of segmenting the interest region using the improved 3D U-Net is also prior art. The present disclosure will not describe the same in detail herein.

Block 15, registering the plurality of interest images.

In fact, the plurality of interest images are scanned at different time points, and may not be scanned from the same position, and, as the patient breathes for example, different interest images may have different coordinate systems. Thus, the plurality of interest images may not be spatially aligned.

In the above embodiment, by registering the plurality of interest images to have the same coordinate system in space, the registered interest images can provide better visualization, and the information between the interest images is more relevant, so that the doctor can make a more accurate diagnosis based on the registered interest images. The accuracy of diagnosis can be improved.

In one embodiment, the registering the plurality of interest images includes: determining one phase from the plurality of target phases as a reference phase, and remaining phases from the plurality of target phases as moving phases; determining enhanced medical images corresponding to the reference phase as reference images, and enhanced medical images corresponding to the moving phases as moving phases; calculating a coordinate map between moving images of each the moving phases and the reference images, based on a coordinate system of the reference images; geometrically changing corresponding the moving images according to each of the coordinate maps to be registered with the reference images.

The geometric changes refers to a process of changing an image into another image according to a certain rule. The geometric changes do not change value of pixels of an image, but maps positional coordinates from one image to another.

The geometric changes can include: a translation, a mirroring, a rotation, a scaling, an affine, and the like.

In one embodiment, the determination of one phase from the plurality of target phases as a reference phase includes calculating coordinates of the interest region in each of the plurality of interest images to obtain a plurality of coordinate ranges; comparing z-axis coordinate ranges in the plurality of coordinate ranges; selecting a coordinate range having a lowest Z-axis coordinate value or a highest z-axis coordinate value as a target coordinate range; and determining one phase corresponding to the target coordinate range as the reference phase. That, is, a total of 4 phases are detected, each phase corresponds to a plurality of interest images. When a three-dimensional coordinate range of the interest region in each of the plurality of interest images is calculated, a coordinate range having a lowest Z-axis coordinate value or a highest z-axis coordinate value is selected as a target coordinate range, and a phase corresponding to the target coordinate range is determined as the reference phase. All enhanced medical images corresponding to the selected reference phases are the reference images, and the other enhanced medical images are the moving images.

DICOM coordinates of the interest region may be calculated using header information (e.g., spacing, origin, direction) in the DICOM file of the interest image. The DICOM coordinates can include: a X-axis coordinate, a Y-axis coordinate, and a Z-axis coordinate. A value of the z-axis coordinate is considered to ensure that the interest region as the reference image has a lowest starting point, thereby workload and time of subsequent registration can be minimized.

In one embodiment, the geometric changing of corresponding the moving images according to each of the coordinate maps to be registered with the reference images includes: calculating a matching degree between the corresponding moving images and the reference images according to the coordinate mapping; determining whether the matching degree is less than a matching degree threshold; stopping the geometric changing when the matching degree is less than or equal to the matching degree threshold; or continuing the geometric changing until the corresponding moving images is registered with the reference images, when the matching degree is greater than the matching degree threshold.

In the above embodiment, the matching degree is used to quantify the quality in the registration process. Registration algorithms (e.g., a sum of squared distances) can be used to calculate the matching degree between the moving images and the reference images.

During the registration process, a function from multiple parameters to a matching degree can be firstly created, and then best geometric changing parameters that maximize the matching degree can be searched for using an optimizer. The optimizer can be any heuristic optimizer.

According to the method, by detecting the phase of each enhanced medical image in the series of enhanced medical images using the 3D convolutional neural network model, and then selecting a plurality of target enhanced medical images from all the enhanced medical images according to the phases, a plurality of interest images are obtained by segmenting an interest region in each of the plurality of target enhanced medical images, and the plurality of interest images are finally registered. The registered images have clear phase markers and are spatially aligned. Therefore, any subsequent doctor can directly use the registered interest images for diagnosis without rescanning the patient.

In addition, the enhanced medical images processing method according to the embodiment of the present disclosure can be embedded in a computer-aided diagnosis (CAD) system, thereby providing better visualization to a radiologist and assisting his work. It should be emphasized that the CAD system is not (at least for the present) intended to replace radiologists but merely to support or guide them during image analysis.

Figure 2:
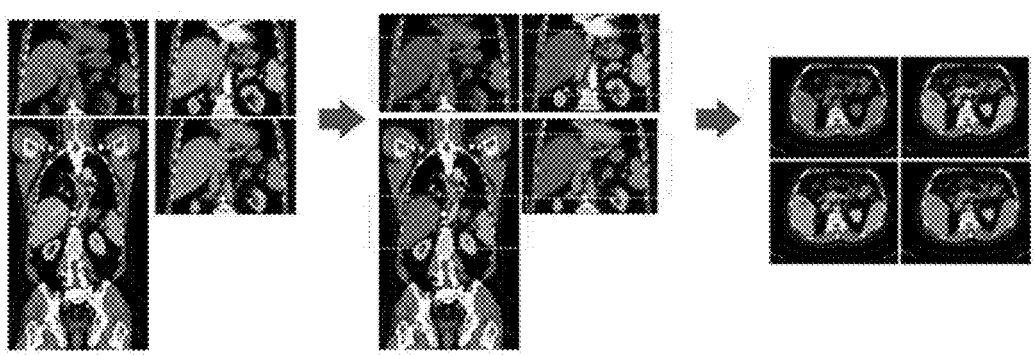
FIG. 2 shows a schematic diagram of registering livers of different phases using the method of FIG. 1 according to the present disclosure.

As shown in FIG. 2, the left side represents a liver enhanced medical image corresponding to the non-contrast/venous/arterial/delayed phase, the middle is the detection and segmentation of a liver region, and the right side is the registration of the segmented liver region. It can be seen that the enhanced medical images processing method according to the embodiment of the present disclosure can segment and register the liver region from the entire enhanced medical image, and the visualization is better.

FIG. 3 shows a schematic flow chart of an embodiment of a 3D convolutional neural network model training method for marking a phase of an enhanced medical image according to the present disclosure.

As shown in FIG. 3, the 3D convolutional neural network model training method can include the following steps. According to different requirements, the order of the steps in the flow chart may be changed, and some may be omitted.

In block 31, obtaining a sample data set, the sample data set including a plurality of enhanced medical image samples, and each enhanced medical image sample corresponds to one phase.

In one embodiment, sample data set can be obtained from a hospital image archiving and/or Picture Archiving and Communication Systems (PACS), or can be obtained from other systems.

In one embodiment, the sample data set can be obtained by scanning a same part of a plurality of patients using various image scanning devices for training the convolutional neural network to obtain a 3D convolutional neural network model.

The following is a network training of the convolutional neural network by taking a plurality of enhanced medical image samples of a plurality of patients (8,972 patients) with liver tumors. The liver tumors involve the following five types: a hepatocellular carcinoma (HCC), a cholangiocarcinoma, a metastasis, a focal nodular hyperplasia (FNH), or a hemangioma (Hemangioma).

The phase corresponding to each the enhanced medical sample data set can be any one of a non-contrast phase, an arterial phase, a vein phase, a delayed phase, and other phases. It should be noted that all phases corresponding to the sample data set must include all the phases in the non-contrast phase, the arterial phase, the venous phase, and the delayed phase. Otherwise, the trained convolutional neural network model cannot mark the phase that is not included in the sample data set. The other phases refer to phases other than the non-contrast phase, the arterial phase, the vein phase, and the delayed phase.

In one embodiment, after obtaining the sample data set, each of the enhanced medical image samples in the sample data set can also be resampled to make a uniform size of the enhanced medical image sample.

In the above embodiment, each of the enhanced medical image samples may be resampled according to a preset sampling frequency, and the size of each the enhanced medical image sample is unified to a preset size, for example, 128*128*32. Re-sampling each of the enhanced medical image samples in the sample data set is to reduce a larger size of the enhanced medical image sample to a smaller size, thereby a memory usage can be reduced. At the same time, making a uniform size of the enhanced medical image samples can also accelerate a convergence speed of the convolutional neural network, thereby an efficiency of training the 3D convolutional neural network model can be improved.

In block 32, dividing a training set from the plurality of enhanced medical image samples.

Dividing a first ratio (e.g., 67. 5%) of the plurality of enhanced medical image samples into the training set, dividing a second ratio (e.g., 12. 5%) of the remaining plurality of enhanced medical image samples into a validation set, another (e.g., 20%) is used as a test set. Wherein a sum of the first ratio, the second ratio and the third ratio is 1.

Specifically, the training set can include a first number (e.g., 6,300) of the enhanced medical image samples of patients with the hepatocellular carcinoma (HCC), and a second number (e.g., 900) of the enhanced medical imaging samples of patients with the cellular cancer (HCC). Enhanced medical imaging samples of patients with the cholangiocarcinoma, the metastasis, the focal nodular hyperplasia (FNH), and the hemangioma are only used for testing.

In block 33, calculating a risk loss value of a risk loss function by inputting the training set into a convolutional neural network.

Inputting the training set into an initial network framework of the convolutional neural network, parameters in the initial network framework need to be trained to be determined.

The initial network framework of the convolutional neural network includes: a plurality of convolution layers, a plurality of pooling layers, one compression excitation layer SE, one global average merge layer, one fully connected layer, and one SoftMax output layer. The loss function in the SoftMax output layer can be a cross entropy (CE) loss function or an aggregated cross entropy (ACE) loss function.

Figure 4:
FIG. 4 shows a schematic structural diagram of a network architecture of a 3D convolutional neural network according to the present disclosure.

As shown in FIG. 4, four convolution layers, three maximum pooling layers, one compression excitation layer SE, one global average merge layer, one fully connected layer, and one SoftMax output layer are schematically shown. Each of the convolutional layers can perform a 3D convolution operation using a convolution kernel of a size of 3×3×3. The global average merge layer can used to reduce a spatial dimension of the three-dimensional tensor and to minimize fit by reducing a total number of parameters in the initial network frame.

The parameter information in the initial network framework of the convolutional neural network is shown in Table 1 below. Table 1, showing the parameter information the initial network framework.

| Stage | Model | Output |
| --- | --- | --- |
| Conv 1 | 3 * 3 * 3, 64, stride = (1, 1, 1) | 32 * 128 * 128 |
| Pool | 1 * 2 * 2, 256, stride = (1, 2, 2) | 32 * 64 * 64 |
| Conv 2 | 3 * 3 * 3, 256, stride = (1, 1, 1) | 32 * 64 * 64 |
| Pool 2 | 2 * 2 * 2, stride = (2, 2, 2) | 16 * 32 * 32 |
| Conv 3a | 3 * 3 * 3, 256, stride = (1, 1, 1) | 16 * 32 * 32 |
| Conv 3b | 3 * 3 * 3, 256, stride = (1, 1, 1) | 16 * 32 * 32 |
| Residual SE Block | Details in FIG. 3 | 16 * 32 * 32 |
| Pool 3 | 2 * 2 * 2, stride = (2, 2, 2) | 8 * 16 * 16 |
| Global AVG Pooling, FC, SoftMax | FC (512, 5) | 5 |

In block 34, when it is determined that the risk loss value of the risk loss function reaches a convergence state, updating parameters in an initial network framework of the convolutional neural network according to the risk loss value.

In one embodiment, the enhanced medical image samples can be convoluted using a plurality of 3D convolution layers in the initial network framework. Local image features of a plurality of enhanced medical image samples in the training set can be extracted by performing a linear rectification function and a maximum pooling operation.

Since the extracted local image features have no global information, it is necessary to use the compressed excitation layer SE in the initial network framework to add global information for each feature channel. Then, a multiplicative factor of each feature channel can be obtained by performing a global pooling operation on the local image features, and the multiplicative factor can be weighted into the local image features to scale each feature channel to obtain a global image feature. Finally, the global image features can be integrated using the fully connected layer in the initial network framework to obtain a classification prediction value. The classification prediction value is input into the risk loss function to calculate the risk loss value. The parameters of the initial network framework can be updated based on the risk loss value using a backpropagation algorithm.

Interdependencies between channels can be difficult to model by independent initialization and training convolution filters, but cross-channel dependencies are one of the main visual modes, so the compression excitation layer SE is inserted between the last convolutional layer and the last pool layer. Then interdependencies between channels can be accounted and an opportunity to recalibrate across channel features can be provided. The compression excitation layer SE belongs to the prior art and will not be described in detail herein.

In block 35, determining the initial network framework after updating the parameters as a trained 3D convolutional neural network model.

After training the 3D convolutional neural network model, the verification set can be used to optimize parameters in the 3D convolutional neural network model, and the test set can be used to test the performance of the 3D convolutional neural network model.

The 3D convolutional neural network model training method according to the embodiment of the present disclosure, obtains a sample data set. The sample data set includes a plurality of enhanced medical image samples, and each enhanced medical image sample corresponds to one phase. A training set is divided out from the plurality of enhanced medical image samples. Then a risk loss value of a risk loss function is calculated by inputting the training set into a convolutional neural network. When it is determined that the risk loss value of the risk loss function reaches a convergence state, parameters in an initial network framework of the convolutional neural network are updated according to the risk loss value. Finally, the initial network framework after updating the parameters is determined as a trained 3D convolutional neural network model. The 3D convolutional neural network model training can mark a phase of an enhanced medical image to obtain a phase with precision. Visual results can be provided for medical data management, and an efficiency and an accuracy of physicians in making diagnoses can be improved.

Figure 5:
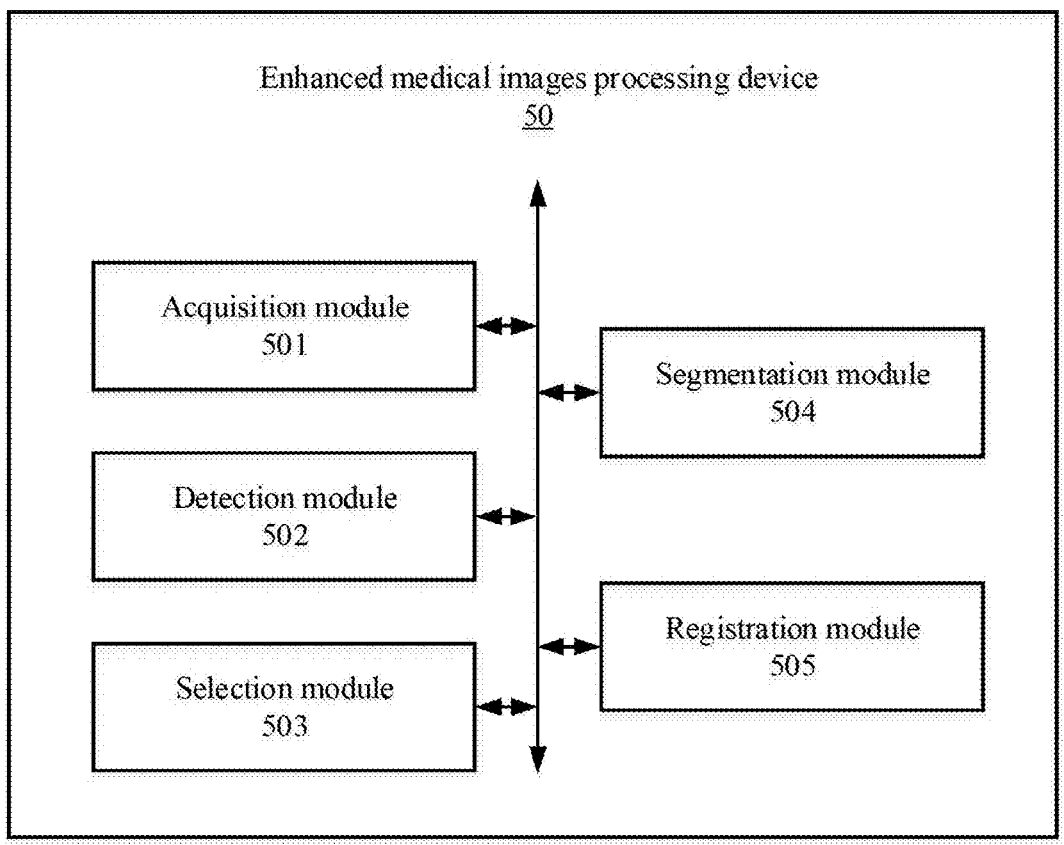
FIG. 5 shows a schematic structural diagram of an embodiment of an enhanced medical images processing device according to the present disclosure.

FIG. 5 shows a schematic structural diagram of an embodiment of an enhanced medical images processing device according to the present disclosure.

In some embodiments, the enhanced medical images processing device 50 can include a plurality of function modules consisting of program code segments. The program code of each program code segments in the device for the enhanced medical images processing device 50 may be stored in a memory of a computing device and executed by the at least one processor to perform (described in detail in FIG. 1) a function of processing a medical image.

In an embodiment, the enhanced medical images processing device 50 can be divided into a plurality of functional modules, according to the performed functions. The functional module can include: an acquisition module 501, a detection module 502, a selection module 503, a segmentation module 504, and a registration module 505. A module as referred to in the present disclosure refers to a series of computer program segments that can be executed by at least one processor and that are capable of performing fixed functions, which are stored in a memory. In this embodiment, the functions of each module will be detailed in the following embodiments.

The acquisition module 501, is configured to acquire series of enhanced medical images.

In one embodiment, the series of enhanced medical images is obtained by scanning a patient's body part with an image scanning device after intravenous injection of contrast media. An enhanced medical image corresponding to different phases between multiple planes can be considered as one frame in the series of enhanced medical images. That is, the series of enhanced medical images will include a plurality of enhanced medical images.

The patient may be a patient suffering from any tumor, such as a liver tumor, a lung tumor, a lymphoma tumor, a hepatic hemangioma, or the like. Thus, the method described in embodiments of the present disclosure assists a doctor to diagnose a patient with any tumor.

The image scanning device can be, for example, a Computed Tomography (CT), a Magnetic Resonance Imaging (MRI), a positron emission tomography (PET), a single photon emission computed tomography (SPECT), a ultrasound scanning, a rotational angiography, and other medical imaging modalities. Correspondingly, the enhanced medical image can be an enhanced CT image, an enhanced MRI image, an enhanced PET image, an enhanced SPECT image, an enhanced ultrasound scan image, and an enhanced rotational angiography image and other enhanced medical imaging modal images.

The detection module 502, is configured to detect a phase of each enhanced medical image in the series of enhanced medical images using a pre-trained 3D convolutional neural network model.

In one embodiment, the phase of each enhanced medical image in the series of enhanced medical images is re-marked by the pre-trained 3D convolutional neural network model to obtain an accurate phase, thereby enabling effective management of the enhanced medical images.

In order to facilitate understanding of the method according to the embodiment of the present disclosure, the following describes an example of taking an enhanced CT image series of a liver tumor patient. The series of enhanced medical images includes a plurality of enhanced medical images.

Phases shown in the enhanced CT images of the liver tumor patient include a non-contrast phase, an arterial phase, a venous phase, and a delayed phase. The non-contrast phase is before any contrast media is injected into a body of the patient. The non-contrast phase can reveal calcifications, fat in tumors, and fat-stranding as seen in inflammations like appendicitis, diverticulitis, ° mental infarction, etc. The arterial phase is when a contrast media is moved from the heart into the arteries, all structures/organs that get their blood supply from the arteries will show optimal enhancement. In the aorta, a major enhancement can be observed. The venous phase is when the contrast media is in the veins, flowing back to the heart. In the venous phase, the liver parenchyma is enhanced through blood supply by the portal vein and some enhancement of the hepatic veins can be seen. The delay phase is when the contrast media flows out of the kidney. Sometimes delay phase is called "washout phase" or "equilibrium phase". There is wash out of contrast media in all structures of the body except for fibrotic tissue, because fibrotic tissue has a poor late washout and will become relatively dense compared to normal tissue.

It should be noted that, in this embodiment, the phases of the enhanced CT images marked by using the pre-trained 3D convolutional neural network model include the non-contrast phase, the arterial phase, the vein phase, the delay phase, and other phases. The term "other phases" means the phases of tumors in all other parts of the body except for these four phases. That is, the pre-trained 3D convolutional neural network model marks phases that are not the non-contrast phase, the arterial phase, the vein phase, and the delay phase as such other phases. As such, phase markers of the enhanced CT images of the liver tumor patient become a five-category problem.

FIG. 3 shows a training process of the 3D convolutional neural network model.

The selection module 503, is configured to select a plurality of target enhanced medical images from all the enhanced medical images according to the phases.

In one embodiment, the series of enhanced medical images can include a plurality of enhanced medical images. Each of the enhanced medical images corresponds to one phase, and different enhanced medical images may correspond to different phases, or may correspond to the same phase.

In some embodiments, the selection module 503 selects the target enhanced medical images from all the enhanced medical images according to the phases includes: screening a plurality of target phases from the phases; selecting a plurality of target enhanced medical images corresponding to each of the plurality of target phases from the enhanced medical images.

For example, the non-contrast phase, the arterial phase, the venous phase, and the delayed phase being screened from the phases as the plurality of target phases, and enhanced medical images corresponding to the non-contrast phase being selected from the enhanced medical images, enhanced medical images corresponding to the arterial phase being selected from the enhanced medical images, enhanced medical images corresponding to the venous phase being selected from the enhanced medical images, enhanced medical images corresponding to the delayed phase being selected from the enhanced medical images. The enhanced medical images corresponding to the non-contrast phase, the enhanced medical images corresponding to the arterial phase, the enhanced medical images corresponding to the venous phase, and the enhanced medical images corresponding to the delayed phase being as the plurality of target enhanced medical images.

Doctors can diagnose different diseases, and the phases of medical interest and the enhanced medical images viewed of this disclosure may be different. For example, when diagnosing liver tumor diseases, doctors focus on the enhanced CT images corresponding to the non-contrast phase, the arterial phase, the venous phase, and the delayed phase, without paying attention to the enhanced CT images corresponding to the other phases. Thus, the computing device sets a plurality of target phase types in advance according to type of disease being diagnosed. For example, in diagnosis of liver tumor, a plurality of target phase types set in advance are: the non-contrast phase, the arterial phase, the vein phase, and the delay phase.

After detecting the enhanced medical images using the 3D convolutional neural network model, a plurality of target phases are screened from all phases, and enhanced medical images corresponding to the plurality of target phases are selected as the target enhanced medical images for subsequent processing.

The image segmentation module 504, is used to obtain a plurality of interest images by segmenting an interest region in each of the plurality of target enhanced medical images.

In one embodiment, the interest region refers to a region in the target enhanced medical image where lesions occur. An improved 3D U-Net (deeply-supervised net) can be used to detect the interest region in each of the plurality of target enhanced medical images, such as the liver region, and then segment or isolate the interest region from each of the target enhanced medical images to obtain the plurality of interest images.

The improved 3D U-Net enables the semantics of the intermediate feature map to be discernible at each image scale, resulting in better results than with an original U-Net.

The improved 3D U-Net is known in prior art, and a process of segmenting the interest region using the improved 3D U-Net is also prior art. The present disclosure will not describe the same in detail herein.

The registration module 505, is used to register the plurality of interest images.

In fact, the plurality of interest images are scanned at different time points, and may not be scanned from the same position, and, as the patient breathes for example, different interest images may have different coordinate systems. Thus, the plurality of interest images may not be spatially aligned.

In the above embodiment, by registering the plurality of interest images to have the same coordinate system in space, the registered interest images can provide better visualization, and the information between the interest images is more relevant, so that the doctor can make a more accurate diagnosis based on the registered interest images. The accuracy of diagnosis can be improved.

In one embodiment, the registration module 505 registers the plurality of interest images includes: determine one phase from the plurality of target phases as a reference phase, and remaining phases from the plurality of target phases as moving phases; determine enhanced medical images corresponding to the reference phase as reference images, and enhanced medical images corresponding to the moving phases as moving phases; calculate a coordinate map between moving images of each the moving phases and the reference images, based on a coordinate system of the reference images; geometrically change corresponding the moving images according to each of the coordinate maps to be registered with the reference images.

The geometric changes refers to a process of changing an image into another image according to a certain rule. The geometric changes do not change value of pixels of an image, but maps positional coordinates from one image to another.

The geometric changes can include: a translation, a mirroring, a rotation, a scaling, an affine, and the like.

In one embodiment, the determination of one phase from the plurality of target phases as a reference phase includes: calculating coordinates of the interest region in each of the plurality of interest images to obtain a plurality of coordinate ranges; comparing z-axis coordinate ranges in the plurality of coordinate ranges; selecting a coordinate range having a lowest Z-axis coordinate value or a highest z-axis coordinate value as a target coordinate range; and determining one phase corresponding to the target coordinate range as the reference phase. That is, a total of 4 phases are detected, each phase corresponds to a plurality of interest images. When a three-dimensional coordinate range of the interest region in each of the plurality of interest images is calculated, a coordinate range having a lowest Z-axis coordinate value or a highest z-axis coordinate value is selected as a target coordinate range, and a phase corresponding to the target coordinate range is determined as the reference phase. All enhanced medical images corresponding to the selected reference phases are the reference images, and the other enhanced medical images are the moving images.

DICOM coordinates of the interest region may be calculated using header information (e.g., spacing, origin, direction) in the DICOM file of the interest image. The DICOM coordinates can include: a X-axis coordinate, a Y-axis coordinate, and a Z-axis coordinate. A value of the z-axis coordinate is considered to ensure that the interest region as the reference image has a lowest starting point, thereby workload and time of subsequent registration can be minimized.

In one embodiment, the geometric changing of corresponding the moving images according to each of the coordinate maps to be registered with the reference images includes: calculating a matching degree between the corresponding moving images and the reference images according to the coordinate mapping; determining whether the matching degree is less than a matching degree threshold; stopping the geometric changing when the matching degree is less than or equal to the matching degree threshold; or continuing the geometric changing until the corresponding moving images is registered with the reference images, when the matching degree is greater than the matching degree threshold.

In the above embodiment, the matching degree is used to quantify the quality in the registration process. Registration algorithms (e.g., a sum of squared distances) can be used to calculate the matching degree between the moving images and the reference images.

During the registration process, a function from multiple parameters to a matching degree can be firstly created, and then best geometric changing parameters that maximize the matching degree can be searched for using an optimizer. The optimizer can be any heuristic optimizer.

According to the device, by detecting the phase of each enhanced medical image in the series of enhanced medical images using the 3D convolutional neural network model, and then selecting a plurality of target enhanced medical images from all the enhanced medical images according to the phases, a plurality of interest images are obtained by segmenting an interest region in each of the plurality of target enhanced medical images, and the plurality of interest images are finally registered. The registered images have clear phase markers and are spatially aligned. Therefore, any subsequent doctor can directly use the registered interest images for diagnosis without rescanning the patient.

In addition, the enhanced medical images processing method according to the embodiment of the present disclosure can be embedded in a computer-aided diagnosis (CAD) system, thereby providing better visualization to a radiologist and assisting his work. It should be emphasized that the CAD system is not (at least for the present) intended to replace radiologists but merely to support or guide them during image analysis.

As shown in FIG. 2, the left side represents a liver enhanced medical image corresponding to the non-contrast/venous/arterial/delayed phase, the middle is the detection and segmentation of a liver region, and the right side is the registration of the segmented liver region. It can be seen that the enhanced medical images processing device according to the embodiment of the present disclosure can segment and register the liver region from the entire enhanced medical image, and the visualization is better.

Figure 6:
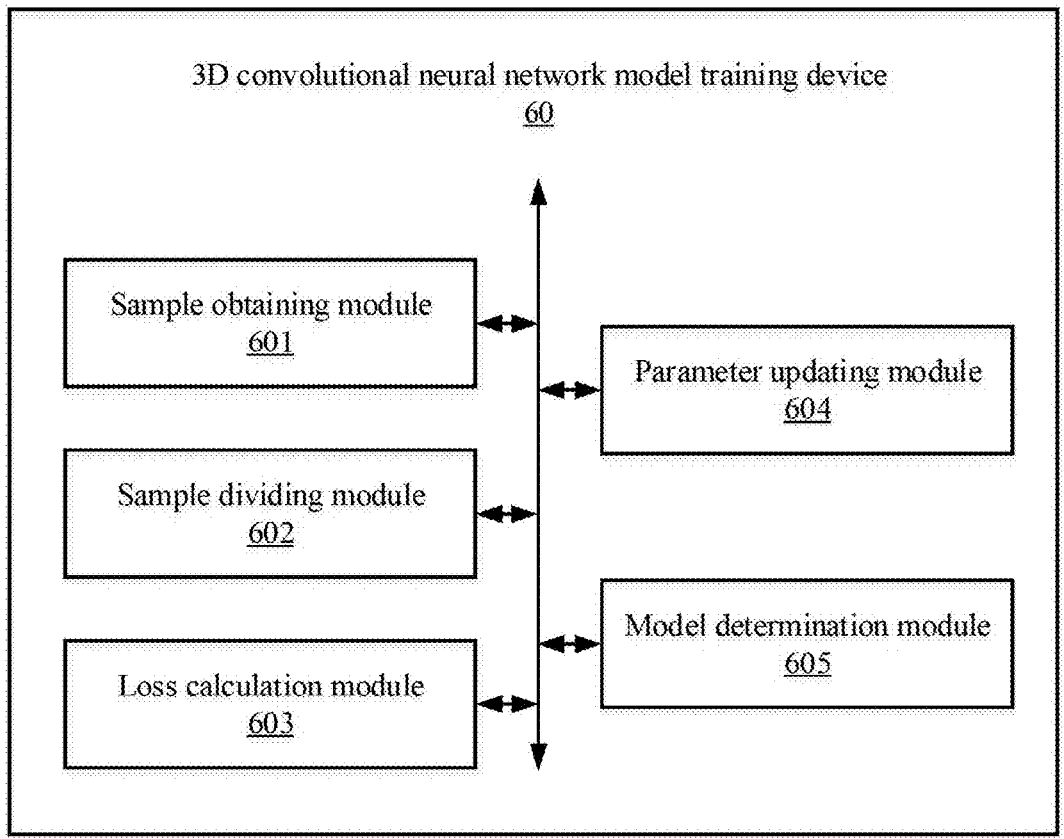
FIG. 6 shows a schematic structural diagram of an embodiment of a 3D convolutional neural network model training device according to the present disclosure.

FIG. 6 shows a schematic structural diagram of an embodiment of a 3D convolutional neural network model training device for marking a phase of an enhanced medical image according to the present disclosure.

In some embodiments, the 3D convolutional neural network model training device 60 can include a plurality of function modules consisting of program code segments. The program code of each program code segments in the 3D convolutional neural network model training device 60 may be stored in a memory of a computing device and executed by the at least one processor to perform (described in detail in FIG. 3) a function of training a 3D convolutional neural network model.

In an embodiment, the 3D convolutional neural network model training device 60 can be divided into a plurality of functional modules, according to the performed functions. The functional module can include: a sample obtaining module 601, a sample dividing module 602, a loss calculation module 603, a parameter updating module 604, and a model determination module 605. A module as referred to in the present disclosure refers to a series of computer program segments that can be executed by at least one processor and that are capable of performing fixed functions, and which are stored in a memory. In this embodiment, the functions of each module will be detailed in the following embodiments.

The sample obtaining module 601, is used to obtain a sample data set, the sample data set including a plurality of enhanced medical image samples, and each enhanced medical image sample corresponds to one phase.

In one embodiment, sample data set can be obtained from a hospital image archiving and/or Picture Archiving and Communication Systems (PACS), or can be obtained from other systems.

In one embodiment, the sample data set can be obtained by scanning a same part of a plurality of patients using various image scanning devices for training the convolutional neural network to obtain a 3D convolutional neural network model.

The following is a network training of the convolutional neural network by taking a plurality of enhanced medical image samples of a plurality of patients (8,972 patients) with liver tumors. The liver tumors involve the following five types: a hepatocellular carcinoma (HCC), a cholangiocarcinoma, a metastasis, a focal nodular hyperplasia (FNH), or a hemangioma (Hemangioma).

The phase corresponding to each the enhanced medical sample data set can be any one of a non-contrast phase, an arterial phase, a vein phase, a delayed phase, and other phases. It should be noted that all phases corresponding to the sample data set must include all the phases in the non-contrast phase, the arterial phase, the venous phase, and the delayed phase. Otherwise, the trained convolutional neural network model cannot mark the phase that is not included in the sample data set. The other phases refer to phases other than the non-contrast phase, the arterial phase, the vein phase, and the delayed phase.

In one embodiment, after obtaining the sample data set, each of the enhanced medical image samples in the sample data set can also be resampled to make a uniform size of the enhanced medical image sample.

In the above embodiment, each of the enhanced medical image samples may be resampled according to a preset sampling frequency, and the size of each the enhanced medical image sample is unified to a preset size, for example, 128*128*32. Re-sampling each of the enhanced medical image samples in the sample data set is to reduce a larger size of the enhanced medical image sample to a smaller size, thereby a memory usage can be reduced. At the same time, making a uniform size of the enhanced medical image samples can also accelerate a convergence speed of the convolutional neural network, thereby an efficiency of training the 3D convolutional neural network model can be improved.

The sample dividing module 602, is used to divide a training set from the plurality of enhanced medical image samples.

Dividing a first ratio (e.g., 67. 5%) of the plurality of enhanced medical image samples into the training set, dividing a second ratio (e.g., 12. 5%) of the remaining plurality of enhanced medical image samples into a validation set, another (e.g., 20%) is used as a test set. Wherein a sum of the first ratio, the second ratio and the third ratio is 1.

Specifically, the training set can include a first number (e.g., 6,300) of the enhanced medical image samples of patients with the hepatocellular carcinoma (HCC), and a second number (e.g., 900) of the enhanced medical imaging samples of patients with the cellular cancer (HCC). Enhanced medical imaging samples of patients with the cholangiocarcinoma, the metastasis, the focal nodular hyperplasia (FNH), and the hemangioma are only used for testing.

The loss calculation module 603 calculates a risk loss value of a risk loss function by inputting the training set into a convolutional neural network.

Inputting the training set into an initial network framework of the convolutional neural network, parameters in the initial network framework need to be trained to be determined.

The initial network framework of the convolutional neural network includes: a plurality of convolution layers, a plurality of pooling layers, one compression excitation layer SE, one global average merge layer, one fully connected layer, and one SoftMax output layer. The loss function in the SoftMax output layer can be a cross entropy (CE) loss function or an aggregated cross entropy (ACE) loss function.

As shown in FIG. 4, four convolution layers, three maximum pooling layers, one compression excitation layer SE, one global average merge layer, one fully connected layer, and one SoftMax output layer are schematically shown. Each of the convolutional layers can perform a 3D convolution operation using a convolution kernel of a size of 3×3×3. The global average merge layer can used to reduce a spatial dimension of the three-dimensional tensor and to minimize fit by reducing a total number of parameters in the initial network frame.

The parameter information in the initial network framework of the convolutional neural network is shown in Table 1 below. Table 1, showing the parameter information in the initial network framework.

| Stage | Model | Output |
|---|---|---|
| Conv 1 | 3 * 3 * 3, 64, stride = (1, 1, 1) | 32 * 128 * 128 |
| Pool 1 | 1 * 2 * 2, 256, stride = (1, 2, 2) | 32 * 64 * 64 |
| Conv 2 | 3 * 3 * 3, 256, stride = (1, 1, 1) | 32 * 64 * 64 |
| Pool 2 | 2 * 2 * 2, stride = (2, 2, 2) | 16 * 32 * 32 |
| Conv 3a | 3 * 3 * 3, 256, stride = (1, 1, 1) | 16 * 32 * 32 |
| Conv 3b | 3 * 3 * 3, 256, stride = (1, 1, 1) | 16 * 32 * 32 |
| Residual SE Block | Details in FIG. 3 | 16 * 32 * 32 |
| Pool 3 | 2 * 2 * 2, stride = (2, 2, 2) | 8 * 16 * 16 |
| Global AVG Pooling, FC, Softrviax | FC (512, 5) | 5 |

The parameter updating module 604, is used to configured to update parameters in an initial network framework of the convolutional neural network according to the risk loss value, when it is determined that the risk loss value of the risk loss function reaches a convergence state.

In one embodiment, the enhanced medical image samples can be convoluted using a plurality of 3D convolution layers in the initial network framework. Local image features of a plurality of enhanced medical image samples in the training set can be extracted by performing a linear rectification function and a maximum pooling operation.

Since the extracted local image features have no global information, it is necessary to use the compressed excitation layer SE in the initial network framework to add global information for each feature channel. Then, a multiplicative factor of each feature channel can be obtained by performing a global pooling operation on the local image features, and the multiplicative factor can be weighted into the local image features to scale each feature channel to obtain a global image feature. Finally, the global image features can be integrated using the fully connected layer in the initial network framework to obtain a classification prediction value. The classification prediction value is input into the risk loss function to calculate the risk loss value. The parameters of the initial network framework can be updated based on the risk loss value using a backpropagation algorithm.

Interdependencies between channels can be difficult to model by independent initialization and training convolution filters, but cross-channel dependencies are one of the main visual modes, so the compression excitation layer SE is inserted between the last convolutional layer and the last pool layer. Then interdependencies between channels can be accounted and an opportunity to recalibrate across channel features can be provided. The compression excitation layer SE belongs to the prior art and will not be described in detail herein.

The model determination module 605, is used to configured to determine the initial network framework after updating the parameters as a trained 3D convolutional neural network model.

After training the 3D convolutional neural network model, the verification set can be used to optimize parameters in the 3D convolutional neural network model, and the test set can be used to test the performance of the 3D convolutional neural network model.

The 3D convolutional neural network model training method according to the embodiment of the present disclosure, obtains a sample data set. The sample data set includes a plurality of enhanced medical image samples, and each enhanced medical image sample corresponds to one phase. A training set is divided out from the plurality of enhanced medical image samples. Then a risk loss value of a risk loss function is calculated by inputting the training set into a convolutional neural network. When it is determined that the risk loss value of the risk loss function reaches a convergence state, parameters in an initial network framework of the convolutional neural network are updated according to the risk loss value. Finally, the initial network framework after updating the parameters is determined as a trained 3D convolutional neural network model. The 3D convolutional neural network model training can mark a phase of an enhanced medical image to obtain a phase with precision. Visual results can be provided for medical data management, and an efficiency and an accuracy of physicians in making diagnoses can be improved.

Figure 7:
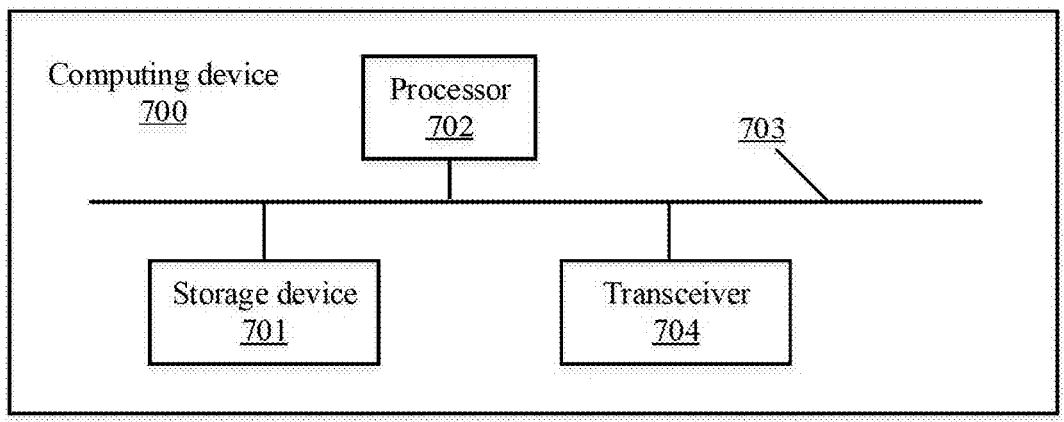
FIG. 7 shows a schematic structural diagram of a computing device according to the present disclosure.

FIG. 7 shows a schematic structural diagram of a computing device according to an embodiment of the present disclosure.

As shown in FIG. 7, the computing device 700 may include: at least one storage device 701, at least one processor 702, at least one communication bus 703, and a transceiver 704.

It should be understood by those skilled in the art that the structure of the computing device 700 shown in FIG. 7 does not constitute a limitation of the embodiment of the present disclosure. The computing device 700 may be a bus type structure or a star type structure, and the computing device 700 may also include more or less hardware or software than illustrated, or may have different component arrangements.

In at least one embodiment, the computing device 700 can include a terminal that is capable of automatically performing numerical calculations and/or information processing in accordance with pre-set or stored instructions. The hardware of the terminal can include, but is not limited to, a microprocessor, an application specific integrated circuit, programmable gate arrays, digital processors, and embedded devices. The computing device 700 may further include an electronic device. The electronic device can interact with a user through a keyboard, a mouse, a remote controller, a touch panel or a voice control device, for example, an individual computers, tablets, smartphones, digital cameras, etc.

It should be noted that the computing device 700 is merely an example, and other existing or future electronic products may be included in the scope of the present disclosure, and are included in the reference.

In some embodiments, the storage device 701 can be used to store program codes of computer readable programs and various data, such as the device for automatically delineating a clinical target volume of esophageal cancer 30 installed in the computing device 700, and automatically access to the programs or data with high speed during running of the computing device 700. The storage device 701 can include a read-only memory (ROM), a programmable read-only memory (PROM), an erasable programmable read only memory (EPROM), an one-time programmable read-only memory (OTPROM), an electronically-erasable programmable read-only memory (EEPROM), a compact disc read-only memory (CD-ROM), or other optical disk storage, magnetic disk storage, magnetic tape storage, or any other non-transitory storage medium readable by the computing device 700 that can be used to carry or store data.

In some embodiments, the at least one processor 702 may be composed of an integrated circuit, for example, may be composed of a single packaged integrated circuit, or may be composed of multiple integrated circuits of same function or different functions. The at least one processor 702 can include one or more central processing units (CPU), a microprocessor, a digital processing chip, a graphics processor, and various control chips. The at least one processor 702 is a control unit of the computing device 700, which connects various components of the computing device 700 using various interfaces and lines. By running or executing a computer program or nodules stored in the storage device 701, and by invoking the data stored in the storage device 701, the at least one processor 702 can perform various functions of the computing device 700 and process data of the computing device 700.

In some embodiments, the least one bus 703 is used to achieve communication between the storage device 701 and the at least one processor 702, and other components of the compute device 700.

Although it is not shown, the computing device 700 may further include a power supply (such as a battery) for powering various components. In some embodiments, the power supply may be logically connected to the at least one processor 702 through a power management device, thereby, the power management device manages functions such as charging, discharging, and power management. The power supply may include one or more a DC or AC power source, a recharging device, a power failure detection circuit, a power converter or inverter, a power status indicator, and the like. The computing device 700 may further include various sensors, such as a BLUETOOTH module, a Wi-Fi module, and the like, and details are not described herein.

It should be understood that the described embodiments are for illustrative purposes only and are not limited by the scope of the present disclosure.

The above-described integrated unit implemented in a form of software function modules can be stored in a computer readable storage medium. The above software function modules are stored in a storage medium, and includes a plurality of instructions for causing a computing device (which may be a personal computer, or a network device, etc.) or a processor to execute the method according to various embodiments of the present disclosure.

In a further embodiment, in conjunction with FIG. 5 or FIG. 6, the at least one processor 702 can execute an operating device and various types of applications (such as the enhanced medical images processing device 50, or the 3D convolutional neural network model training device 60) installed in the computing device 700, program codes, and the like. For example, the at least one processor 702 can execute the modules 501-505, or the modules 601-605.

In at least one embodiment, the storage device 701 stores program codes. The at least one processor 702 can invoke the program codes stored in the storage device 701 to perform related functions. For example, the modules described in FIG. 5 or FIG. 6 are program codes stored in the storage device 701 and executed by the at least one processor 702, to implement the functions of the various modules.

In at least one embodiment, the storage device 701 stores a plurality of instructions that are executed by the at least one processor 702 to implement all or part of the steps of the method described in the embodiments of the present disclosure.

Specifically, the storage device 701 stores the plurality of instructions which when executed by the at least one processor 702, causes the at least one processor 702 to:

acquire series of enhanced medical images;

detect a phase of each enhanced medical image in the series of enhanced medical images using a pre-trained 3D convolutional neural network model;

select a plurality of target enhanced medical images from all the enhanced medical images according to the phases;

obtain a plurality of interest images by segmenting an interest region in each of the plurality of target enhanced medical images; and register the plurality of interest images.

The embodiment of the present disclosure further provides a computer storage medium, and the computer storage medium store a program that performs all or part of the steps including any of the method described in the above embodiments.

A non-transitory storage medium having stored thereon instructions that, when executed by a processor of a computing device, causes the computing device to perform an enhanced medical images processing method, the method comprising: acquiring series of enhanced medical images; detecting a phase of each enhanced medical image in the series of enhanced medical images using a pre-trained 3D convolutional neural network model; selecting a plurality of target enhanced medical images from all the enhanced medical images according to the phases; obtaining a plurality of interest images by segmenting an interest region in each of the plurality of target enhanced medical images; and registering the plurality of interest images.

Wherein the selecting a plurality of target enhanced medical images from all the enhanced medical images according to the phases comprises: screening a plurality of target phases from the phases; and selecting a plurality of target enhanced medical images corresponding to each of the plurality of target phases from the enhanced medical images Wherein the registering the plurality of interest images comprises: determining one phase from the plurality of target phases as a reference phase, and remaining phases from the plurality of target phases as moving phases; determining enhanced medical images corresponding to the reference phase as reference images, and enhanced medical images corresponding to the moving phases as moving phases; calculating a coordinate map between each of the moving images of each the moving phases and the reference images, based on a coordinate system of the reference images; and geometrically changing corresponding the moving images according to each of the coordinate maps to be registered with the reference images.

Wherein the determining one phase from the plurality of target phases as a reference phase comprises: calculating coordinates of the interest region in each of the plurality of interest images to obtain a plurality of coordinate ranges; comparing z-axis coordinate ranges in the plurality of coordinate ranges; selecting a coordinate range having a lowest Z-axis coordinate value or a highest z-axis coordinate value as a target coordinate range; and determining one phase corresponding to the target coordinate range as the reference phase.

Wherein the geometrically changing corresponding the moving images according to each of the coordinate maps to be registered with the reference images comprises: calculating a matching degree between the corresponding moving images and the reference images according to the coordinate mapping; determining whether the matching degree is less than a matching degree threshold; stopping the geometric changing when the matching degree is less than or equal to the matching degree threshold; or continuing the geometric changing until the corresponding moving images is registered with the reference images, when the matching degree is greater than the matching degree threshold.

Wherein a training process of the 3D convolutional neural network model comprises: obtaining a sample data set, the sample data set including a plurality of enhanced medical image samples, and each enhanced medical image sample corresponds to one phase; dividing a training set from the plurality of enhanced medical image samples; calculating a risk loss value of a risk loss function by inputting the training set into a convolutional neural network; updating parameters in an initial network framework of the convolutional neural network according to the risk loss value, when it is determined that the risk loss value of the risk loss function reaches a convergence state; determining the initial network framework after updating the parameters as a trained 3D convolutional neural network model.

It should be noted that, for a simple description, the above method embodiments expressed as a series of action combinations, but those skilled in the art should understand that the present disclosure is not limited by the described action sequence. According to the present disclosure, some steps in the above embodiments can be performed in other sequences or simultaneously. Secondly those skilled in the art should also understand that the embodiments described in the specification are all optional embodiments, and the actions and units involved are not necessarily required by the present disclosure.

In the above embodiments, descriptions of each embodiment has different focuses, and when there is no detail part in a certain embodiment, please refer to relevant parts of other embodiments.

In several embodiments provided in the preset application, it should be understood that the disclosed apparatus can be implemented in other ways. For example, the device embodiments described above are merely illustrative. For example, divisions of the unit are only a logical function division, and there can be other division ways in actual implementation.

The modules described as separate components may or may not be physically separated, and the components displayed as modules may or may not be physical units. That is, it can locate in one place, or distribute to multiple network units. Some or all of the modules can be selected according to actual needs to achieve the purpose of the solution of above embodiments.

In addition, each functional unit in each embodiment of the present disclosure can be integrated into one processing unit, or can be physically present separately in each unit, or two or more units can be integrated into one unit. The above integrated unit can be implemented in a form of hardware or in a form of a software functional unit.

It is apparent to those skilled in the art that the present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims instead all changes in the meaning and scope of equivalent elements are included in the present disclosure. Any reference signs in the claims should not be construed as limiting the claim.

The above embodiments are only used to illustrate technical solutions of the present disclosure, rather than restrictions on the technical solutions. Although the present disclosure has been described in detail with reference to the above embodiments, those skilled in the art should understand that the technical solutions described in one embodiments can be modified, or some of technical features can be equivalently substituted, and these modifications or substitutions do not detract from the essence of the corresponding technical solutions from the scope of the technical solutions of the embodiments of the present disclosure.

We claim:

1. An enhanced medical images processing method applicable in a computing device, the method comprising:
   acquiring series of enhanced medical images;
   detecting a phase of each enhanced medical image in the series of enhanced medical images using a pre-trained 3D convolutional neural network model;
   selecting a plurality of target enhanced medical images from all the enhanced medical images according to the phases;
   obtaining a plurality of interest images by segmenting an interest region in each of the plurality of target enhanced medical images; and
   registering the plurality of interest images.

2. The enhanced medical images processing method of claim 1, wherein the selecting a plurality of target enhanced medical images from all the enhanced medical images according to the phases comprises:
   screening a plurality of target phases from the phases; and
   selecting a plurality of target enhanced medical images corresponding to each of the plurality of target phases from the enhanced medical images.

3. The enhanced medical images processing method of claim 2, wherein the registering the plurality of interest images comprises:
   determining one phase from the plurality of target phases as a reference phase, and remaining phases from the plurality of target phases as moving phases;
   determining enhanced medical images corresponding to the reference phase as reference images, and enhanced medical images corresponding to the moving phases as moving phases;
   calculating a coordinate map between moving images of each the moving phases and the reference images, based on a coordinate system of the reference images; and
   geometrically changing corresponding the moving images according to each of the coordinate maps to be registered with the reference images.

4. The enhanced medical images processing method of claim 3, wherein the determining one phase from the plurality of target phases as a reference phase comprises:
   calculating coordinates of the interest region in each of the plurality of interest images to obtain a plurality of coordinate ranges;
   comparing z-axis coordinate ranges in the plurality of coordinate ranges;
   selecting a coordinate range having a lowest Z-axis coordinate value or a highest z-axis coordinate value as a target coordinate range; and
   determining one phase corresponding to the target coordinate range as the reference phase.

5. The enhanced medical images processing method of claim 3, wherein the geometrically changing corresponding the moving images according to each of the coordinate maps to be registered with the reference images comprises:
 calculating a matching degree between the corresponding moving images and the reference images according to the coordinate mapping;
 determining whether the matching degree is less than a matching degree threshold;
 stopping the geometric changing when the matching degree is less than or equal to the matching degree threshold; or
 continuing the geometric changing until the corresponding moving images is registered with the reference images, when the matching degree is greater than the matching degree threshold.

6. The enhanced medical images processing method of claim 1, wherein a training process of the 3D convolutional neural network model comprises:
 obtaining a sample data set, the sample data set including a plurality of enhanced medical image samples, and each enhanced medical image sample corresponds to one phase;
 dividing a training set from the plurality of enhanced medical image samples;
 calculating a risk loss value of a risk loss function by inputting the training set into a convolutional neural network;
 updating parameters in an initial network framework of the convolutional neural network according to the risk loss value, when it is determined that the risk loss value of the risk loss function reaches a convergence state; and
 determining the initial network framework after updating the parameters as a trained 3D convolutional neural network model.

7. The enhanced medical images processing method of claim 6, wherein the initial network framework of the convolutional neural network includes: a plurality of convolution layers, a plurality of pooling layers, one compression excitation layer SE, one global average merge layer, one fully connected layer, and one SoftMax output layer.

8. A computing device, comprising:
 at least one processor; and
 a storage device storing one or more programs which when executed by the at least one processor, causes the at least one processor to:
 acquire series of enhanced medical images;
 detect a phase of each enhanced medical image in the series of enhanced medical images using a pre-trained 3D convolutional neural network model;
 select a plurality of target enhanced medical images from all the enhanced medical images according to the phases;
 obtain a plurality of interest images by segmenting an interest region in each of the plurality of target enhanced medical images; and
 register the plurality of interest images.

9. The computing device of claim 8, wherein the at least one processor to select a plurality of target enhanced medical images from all the enhanced medical images according to the phases comprises:
 screening a plurality of target phases from the phases; and
 selecting a plurality of target enhanced medical images corresponding to each of the plurality of target phases from the enhanced medical images.

10. The computing device of claim 9, wherein the at least one processor to register the plurality of interest images comprises;
 determine one phase from the plurality of target phases as a reference phase, and remaining phases from the plurality of target phases as moving phases;
 determine enhanced medical images corresponding to the reference phase as reference images, and enhanced medical images corresponding to the moving phases as moving phases;
 calculate a coordinate map between moving images of each the moving phases and the reference images, based on a coordinate system of the reference images; and
 geometrically change corresponding the moving images according to each of the coordinate maps to be registered with the reference images.

11. The computing device of claim 10, wherein the at least one processor to determine one phase from the plurality of target phases as a reference phase comprises:
 calculate coordinates of the interest region in each of the plurality of interest images to obtain a plurality of coordinate ranges;
 compare z-axis coordinate ranges in the plurality of coordinate ranges;
 select a coordinate range having a lowest Z-axis coordinate value or a highest z-axis coordinate value as a target coordinate range; and
 determine one phase corresponding to the target coordinate range as the reference phase.

12. The computing device of claim 10, wherein the at least one processor to geometrically, change corresponding the moving images according to each of the coordinate maps to be registered with the reference images comprises:
 calculating a matching degree between the corresponding moving images and the reference images according to the coordinate mapping;
 determining whether the matching degree is less than a matching degree threshold;
 stopping the geometric changing when the matching degree is less than or equal to the matching degree threshold; or
 continuing the geometric changing until the corresponding moving images is registered with the reference images, when the matching degree is greater than the matching degree threshold.

13. The computing device of claim 8, wherein at least one processor to train the 3D convolutional neural network model comprises:
 obtaining a sample data set, the sample data set including a plurality of enhanced medical image samples, and each enhanced medical image sample corresponds to one phase;
 dividing a training set from the plurality of enhanced medical image samples;
 calculating a risk loss value of a risk loss function by inputting the training set into a convolutional neural network;
 updating parameters in an initial network framework of the convolutional neural network according to the risk loss value, when it is determined that the risk loss value of the risk loss function reaches a convergence state; and
 determining the initial network framework after updating the parameters as a trained 3D convolutional neural network model.

14. The computing device of claim 13, wherein the initial network framework of the convolutional neural network includes: a plurality of convolution layers, a plurality of pooling layers, one compression excitation layer SE, one global average merge layer, one fully connected layer, and one SoftMax output layer.

15. A non-transitory storage medium having stored thereon instructions that, when executed by a processor of a computing device, causes the computing device to perform an enhanced medical images processing method, the method comprising:
acquiring series of enhanced medical images;
detecting a phase of each enhanced medical image in the series of enhanced medical images using a pre-trained 3D convolutional neural network model;
selecting a plurality of target enhanced medical images from all the enhanced medical images according to the phases;
obtaining a plurality of interest images by segmenting an interest region in each of the plurality of target enhanced medical images; and
registering the plurality of interest images.

16. The non-transitory storage medium of claim 15, wherein the selecting a plurality of target enhanced medical images from all the enhanced medical images according to the phases comprises:
screening a plurality of target phases from the phases; and
selecting a plurality of target enhanced medical images corresponding to each of the plurality of target phases from the enhanced medical images.

17. The non-transitory storage medium of claim 16, wherein the registering the plurality of interest images comprises:
determining one phase from the plurality of target phases as a reference phase, and remaining phases from the plurality of target phases as moving phases;
determining enhanced medical images corresponding to the reference phase as reference images, and enhanced medical images corresponding to the moving phases as moving phases;
calculating a coordinate map between each of the moving images of each the moving phases and the reference images, based on a coordinate system of the reference images; and
geometrically changing corresponding the moving images according to each of the coordinate maps to be registered with the reference images.

18. The non-transitory storage medium of claim 17, wherein the determining one phase from the plurality of target phases as a reference phase comprises:
calculating coordinates of the interest region in each of the plurality of interest images to obtain a plurality of coordinate ranges;
comparing z-axis coordinate ranges in the plurality of coordinate ranges;
selecting a coordinate range having a lowest Z-axis coordinate value or a highest z-axis coordinate value as a target coordinate range; and
determining one phase corresponding to the target coordinate range as the reference phase.

19. The non-transitory storage medium of claim 17, wherein the geometrically changing corresponding the moving images according to each of the coordinate maps to be registered with the reference images comprises:
calculating a matching degree between the corresponding moving images and the reference images according to the coordinate mapping;
determining whether the matching degree is less than a matching degree threshold;
stopping the geometric changing when the matching degree is less than or equal to the matching degree threshold; or
continuing the geometric changing until the corresponding moving images is registered with the reference images, when the matching degree is greater than the matching degree threshold.

20. The non-transitory storage medium of claim 15, wherein a training process of the 3D convolutional neural network model comprises:
obtaining a sample data set, the sample data set including a plurality of enhanced medical image samples, and each enhanced medical image sample corresponds to one phase;
dividing a training set from the plurality of enhanced medical image samples;
calculating a risk loss value of a risk loss function by inputting the training set into a convolutional neural network;
updating parameters in an initial network framework of the convolutional neural network according to the risk loss value, when it is determined that the risk loss value of the risk loss function reaches a convergence state; and
determining the initial network framework after updating the parameters as a trained 3D convolutional neural network model.

* * * * *